(12) United States Patent
Lee

(10) Patent No.: US 11,863,822 B2
(45) Date of Patent: *Jan. 2, 2024

(54) AUDIO/VIDEO RECEIVING DEVICE AND WIRELESS DISPLAY SYSTEM

(71) Applicant: LG ELECTRONICS INC., Seoul (KR)

(72) Inventor: Hojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,214

(22) Filed: Dec. 12, 2022

(65) Prior Publication Data

US 2023/0104502 A1 Apr. 6, 2023

Related U.S. Application Data

(63) Continuation of application No. 17/444,407, filed on Aug. 4, 2021, now Pat. No. 11,553,249.

(30) Foreign Application Priority Data

Jun. 28, 2021 (KR) ........................ 10-2021-0083714

(51) Int. Cl.
*H04N 21/443* (2011.01)
*H04N 21/442* (2011.01)
*H04N 21/436* (2011.01)

(52) U.S. Cl.
CPC ....... *H04N 21/4436* (2013.01); *H04N 21/436* (2013.01); *H04N 21/44218* (2013.01)

(58) Field of Classification Search
None
See application file for complete search history.

(56) References Cited

U.S. PATENT DOCUMENTS

| | | |
|---|---|---|
| 5,805,201 A | 9/1998 | Fujiwara |
| 2006/0170828 A1 | 8/2006 | Muschallik et al. |
| 2014/0289782 A1 | 9/2014 | Kawasaki |
| 2018/0184164 A1 | 6/2018 | Petruzzelli |

(Continued)

FOREIGN PATENT DOCUMENTS

| | | |
|---|---|---|
| CN | 106534936 | 3/2017 |
| JP | 2006054710 | 2/2006 |
| KR | 100755711 | 9/2007 |

(Continued)

OTHER PUBLICATIONS

Korean Intellectual Property Office Application Serial No. 10-2021-0083714, Office Action dated Dec. 31, 2022, 4 pages.

(Continued)

*Primary Examiner* — William J Kim
(74) *Attorney, Agent, or Firm* — LEE, HONG, DEGERMAN, KANG & WAIMEY

(57) ABSTRACT

An Audio/Video (A/V) receiving device may include a display, a Radio Frequency (RF) receiving module configured to receive an RF packet from an A/V transmitting device, the RF receiving module including a plurality of antennas, and a microcomputer configured to obtain a distance between the A/V transmitting device and A/V receiving device and when the obtained distance is changed, display a first message indicating that a number of antennas to be turned among the plurality of antennas is changed according to the change of the distance.

19 Claims, 7 Drawing Sheets

(56) References Cited

U.S. PATENT DOCUMENTS

2019/0379467 A1    12/2019    Neumeier et al.

FOREIGN PATENT DOCUMENTS

| | | |
|---|---|---|
| KR | 20160022163 | 2/2016 |
| KR | 20160036459 | 4/2016 |
| KR | 20190067052 | 6/2019 |
| WO | 2010100889 | 9/2010 |
| WO | 2012131938 | 10/2012 |
| WO | 2019179381 | 9/2019 |

OTHER PUBLICATIONS

European Patent Office Application Serial No. 21190094.9, Search Report dated Jan. 31, 2022, 7 pages.
United States Patent and Trademark Office U.S. Appl. No. 17/444,407, Office Action dated May 31, 2022, 12 pages.
United States Patent and Trademark Office U.S. Appl. No. 17/444,407, Notice of Allowance dated Sep. 16, 2022, 7 pages.

FIG. 5
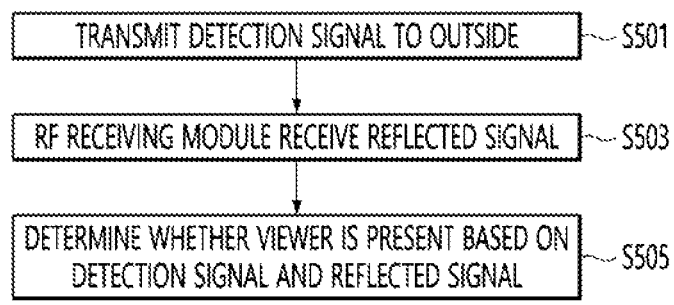
FIG. 6
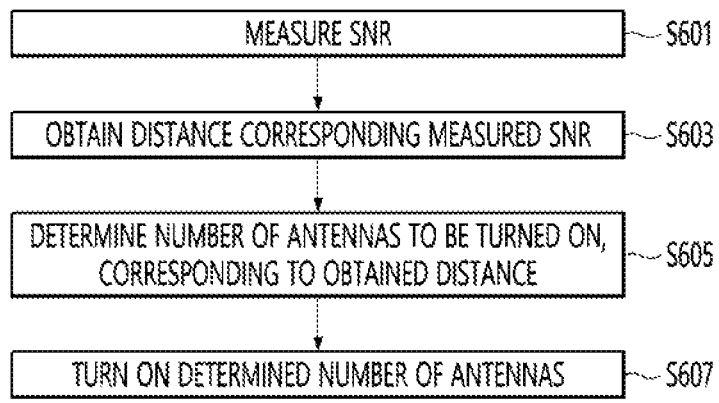
FIG. 7
700
| SNR (dB) | DISTANCE (m) |
|---|---|
| 20 | 5 |
| 40 | 4 |
| 60 | 3 |
| 80 | 2 |

| DISTANCE (m) | NUMBER OF ANTENNAS TO BE TURNED ON |
|---|---|
| 5 | 32 |
| 4 | 24 |
| 6 | 16 |
| 2 | 8 |

1000

| SNR (dB) | DISTANCE (m) | NUMBER OF ANTENNAS TO BE TURNED ON |
|---|---|---|
| 20 | 5 | 32 |
| 40 | 4 | 24 |
| 60 | 3 | 16 |
| 80 | 2 | 8 |

_US 11,863,822 B2_

AUDIO/VIDEO RECEIVING DEVICE AND WIRELESS DISPLAY SYSTEM

CROSS-REFERENCE TO RELATED APPLICATIONS

This application is a continuation of U.S. patent application Ser. No. 17/444,407, filed on Aug. 4, 2021, which pursuant to 35 U.S.C. § 119(a), claims the benefit of earlier filing date and right of priority to Korean Patent Application No. 10-2021-0083714, filed on Jun. 28, 2021, the contents of which are hereby incorporated by reference herein in its entirety.

BACKGROUND OF THE INVENTION

Field of the Invention

The present disclosure relates to a wireless display system for wirelessly transmitting and receiving A/V data.

Discussion of the Related Art

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (UHD) beyond Full HD. UHD, which supports high image quality and ultra-high resolution, is spotlighted as a next-generation media environment. The UHD supports 4K (3840×2160) and 8 K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution image to a display device has emerged.

The wireless display system is a system for transmitting and receiving A/V data between an A/V transmitting device and an A/V receiving device through a local area network.

The A/V receiving device displays A/V data received from the A/V transmitting device.

Since A/V data is transmitted through an antenna in the wireless display system, it is an important task to prevent power consumption.

Conventionally, in order to reduce power consumption, the amount of transmitted data may be changed through an increase in a compression ratio, or power may be indirectly reduced through a decrease in luminance.

However, the conventional technique indirectly reduces set power consumption by adjusting the amount of data or lowering screen brightness to provide additional deterioration factors such as loss in image quality for the user, causing a problem in which power consumption of a wireless communication device itself cannot be lowered.

SUMMARY OF THE INVENTION

An object of the present disclosure is to reduce power consumption caused by an antenna according to an environment between a transmitting device and a receiving device in a wireless display system.

An object of the present disclosure is to reduce power consumption caused by an antenna in a wireless display system according to whether a user is absent.

According to an embodiment of the present disclosure, an Audio/Video (A/V) receiving device may include a display, a Radio Frequency (RF) receiving module configured to receive an RF packet from an A/V transmitting device, the RF receiving module including a plurality of antennas, and a microcomputer configured to obtain a distance between the A/V transmitting device and A/V receiving device and when the obtained distance is changed, display a first message indicating that a number of antennas to be turned among the plurality of antennas is changed according to the change of the distance.

According to another embodiment of the present disclosure, a wireless display system may include an A/V transmitting device configured to generate an RF packet and transmit the generated RF packet to an A/V receiving device through RF communication, and an A/V receiving device configured to obtain a distance between the A/V transmitting device and A/V receiving device and when the obtained distance is changed, display a first message indicating that a number of antennas to be turned among the plurality of antennas is changed according to the change of the distance.

According to the embodiments of the present disclosure, the number of activated antennas is adjusted according to a distance between the transmitting device and the receiving device, thus preventing power consumption.

In addition, according to the embodiments of the present disclosure, when it is detected that a viewer is absent, the number of activated antennas is minimized, preventing unnecessary power consumption.

BRIEF DESCRIPTION OF THE DRAWINGS

FIG. 5 is a view for describing a process of determining a viewer's absence through an RF receiving module, according to an embodiment of the present disclosure.

FIG. 6 is a flowchart for describing a process of obtaining a distance between an A/V transmitting device and an A/V receiving device and determining the number of antennas to be turned on corresponding to the obtained distance according to an embodiment of the present disclosure.

FIG. 7 is a diagram for describing a distance table indicating a correspondence relationship between an SNR and a distance between an A/V transmitting device and an A/V receiving device according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A video/audio (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
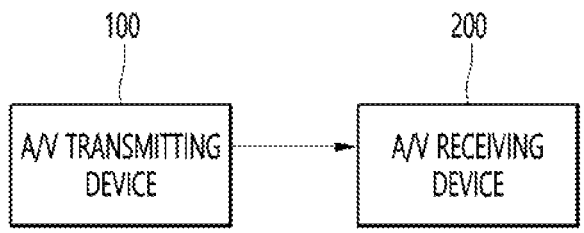
FIGS. 1 and 2 are diagrams for describing a configuration of a display system according to an embodiment of the present disclosure.
Figure 2:
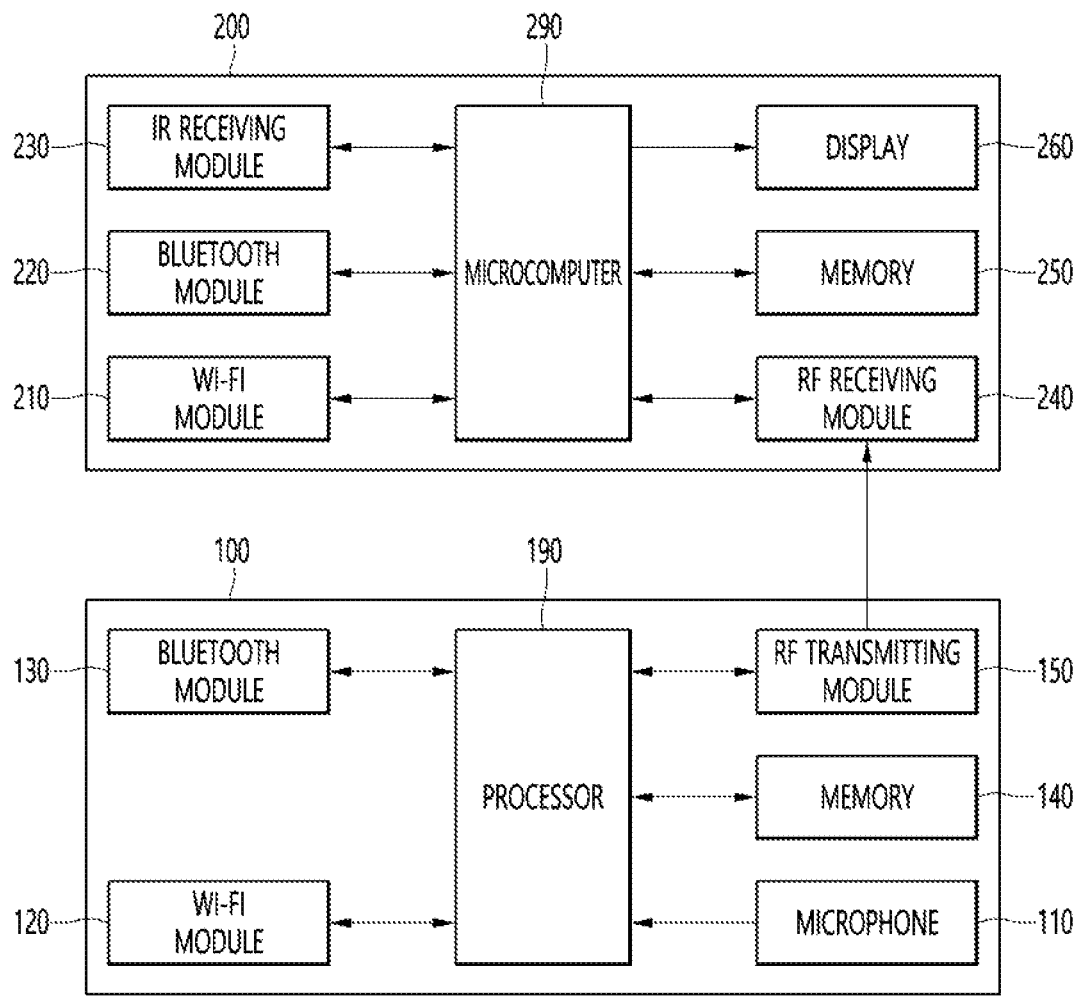

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding video and audio and transmitting the encoded content video and audio in a wireless manner.

The A/V transmitting device 100 may be a set-top box.

The A/V transmitting device 100 may be connected to an external device such as a set-top box or a USB memory. The A/V transmitting device 100 may transmit a video signal or an audio signal received from the connected external device to the A/V receiving device 200.

The A/V receiving device 200 may be a display device capable of wirelessly receiving an encoded video and audio and decoding the received video and audio.

The A/V transmitting device 100 and the A/V receiving device 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The A/V transmitting device 100 may determine a type of the content video input from the outside and determine a compression radio of the content video based on the determined type. The compression rate of the content video may be defined as a ratio between the size of video data before encoding and the size of video data after encoding.

The type of the content image may include a still image type, a general video type, and a game video type.

The A/V transmitting device 100 may compress the content video according to the determined compression ratio, and wirelessly transmit the compressed content video to the A/V receiving device 200.

The A/V receiving device 200 may restore the compressed content video received from the A/V transmitting device 100 and display the restored content video on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150 and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed video, audio, or data signal.

The memory 140 may perform a function for temporarily storing video, audio, or data signals input from the outside, and store information on a predetermined image through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 110 may be configured in the form of a system on chip (SoC).

A plurality of processors 190 may be provided.

The processor 190 may compress a video signal or an audio signal input from the outside, and transmit the compressed signal to the RF transmitting module 150.

The processor 190 may include an encoder for compressing a video signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 130 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed video, audio, or data signal.

The display 260 may display a video signal received from the microcomputer 290.

The display 260 may display the video signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
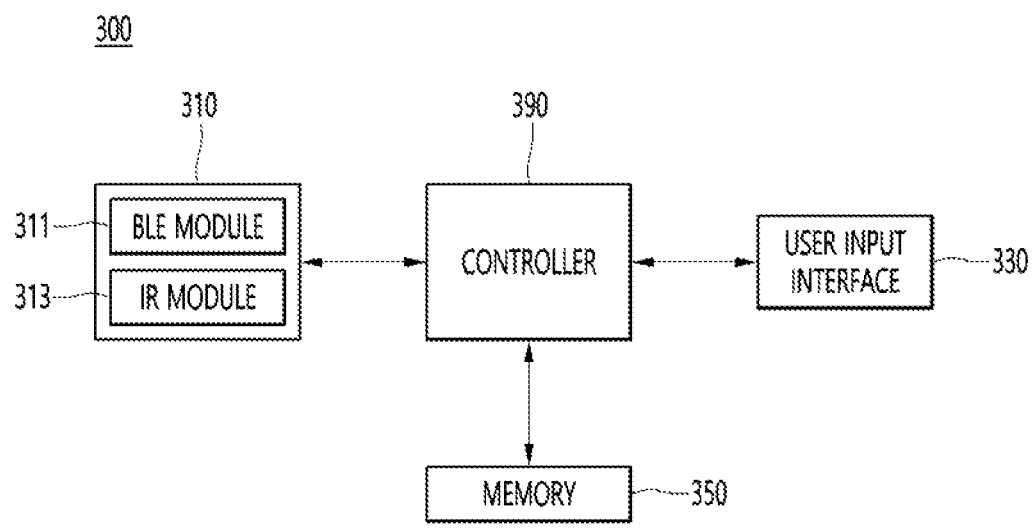
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
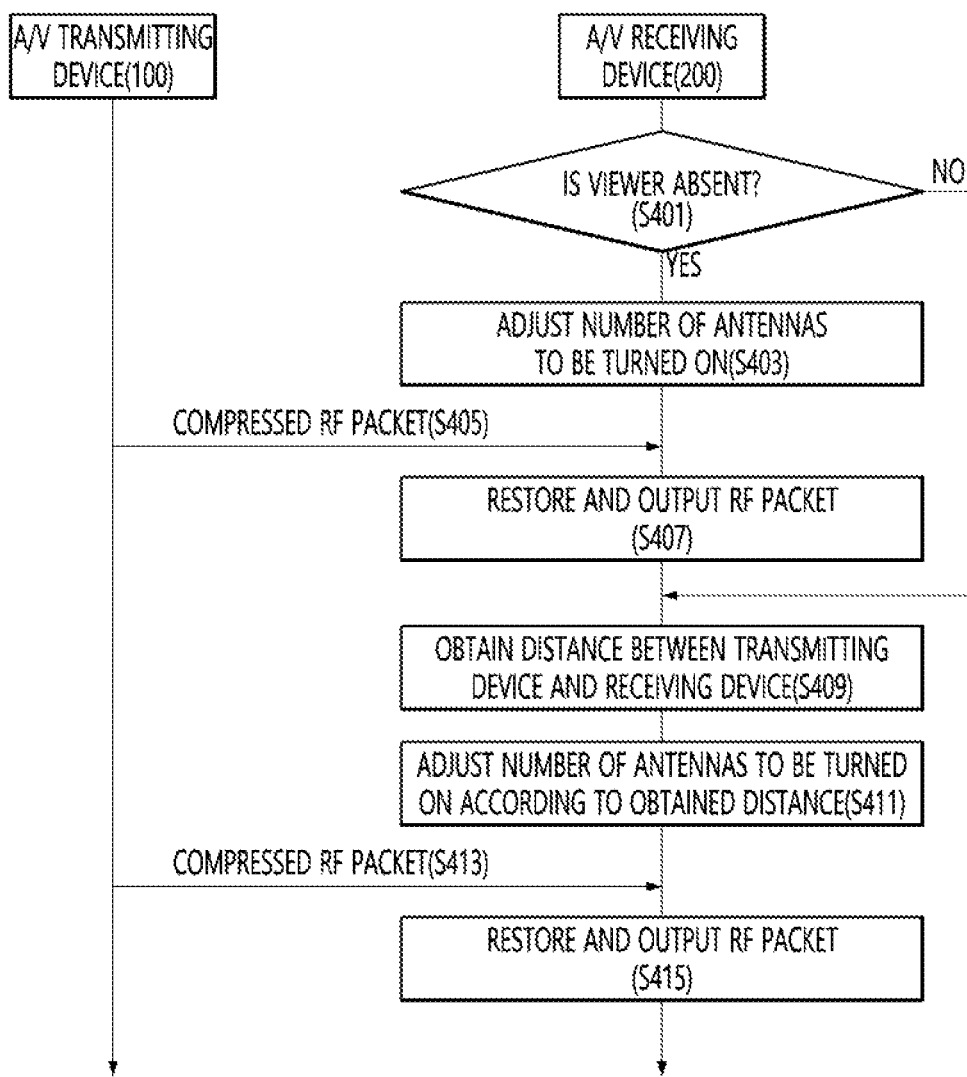
FIG. 4 is a ladder diagram for describing a method of operating a wireless display system according to an embodiment of the present disclosure.

FIG. 4 is a ladder diagram for describing a method of operating a wireless display system according to an embodiment of the present disclosure.

FIG. 4 shows an embodiment for activating (turning on) only some of the plurality of antennas provided in the RF receiving module 240 based on one or more of a viewer's absence or a distance between the A/V transmitting device 100 and the A/V receiving device 100.

The RF receiving module 240 may operate in a reception mode for reception of A/V data, in a situation where a viewer is absent, or in a transmission mode for measuring a distance between the A/V transmitting device 100 and the A/V receiving device 200.

In general, the RF receiving module 240 may operate in the reception mode, and may operate in the transmission mode in a blank section in which A/V data is not received.

Referring to FIG. 4, the microcomputer 290 of the A/V receiving device 200 determines whether a viewer is absent (S401).

In an embodiment, the microcomputer 290 may determine whether a viewer is absent through the RF receiving module 240.

Details will be described with reference to FIG. 5.

FIG. 5 is a view for describing a process of determining a viewer's absence through an RF receiving module, according to an embodiment of the present disclosure.

FIG. 5 shows an embodiment of step S401.

In FIG. 5, it is assumed that the operation mode of the RF receiving module 240 is the transmission mode.

Referring to FIG. 5, the microcomputer 290 of the A/V receiving device 200 transmits a detection signal to the outside through the RF receiving module 240 (S501).

The microcomputer 290 may perform control such that one or more antennas provided in the RF receiving module 240 output a detection signal to the front.

The detection signal may be an RF signal used to determine the absence of a viewer in the front of the A/V receiving device 200.

The RF receiving module 240 of the A/V receiving device 200 may receive a reflected signal in which the detection signal is reflected by the object (S503).

The microcomputer 290 of the A/V receiving device 200 determines whether a viewer is present based on the detection signal and the reflected signal (S505).

The microcomputer 290 may determine whether a viewer is present based on the difference or sum of the detection signal and the reflected signal. When the frequency of a difference frequency signal corresponding to the difference between the detection signal and the reflected signal is within a preset first frequency range, the microcomputer 290 may determine that a viewer is present.

Conversely, when the frequency of a difference frequency signal corresponding to the difference between the detection signal and the reflected signal is out of the preset first frequency range, the microcomputer 290 may determine that a viewer is absent.

When the frequency of a sum frequency signal corresponding to the sum of the detection signal and the reflected signal is within a preset second frequency range, the microcomputer 290 may determine that a viewer is present.

When the frequency of a sum frequency signal corresponding to the sum of the detection signal and the reflected signal is out of the preset second frequency range, the microcomputer 290 may determine that a viewer is absent.

Again, description will be given referring again to FIG. 4.

In another embodiment, the microcomputer 290 may determine the viewer's absence through a camera (not shown) provided in the A/V receiving device 200. In this case, the microcomputer 290 may determine whether there is an image of a person through the analysis of an image photographed by a camera, and when there is a person, determine that the viewer is present.

The microcomputer 290 of the A/V receiving device 200 may adjust the number of antennas to be turned on among the plurality of antennas included in the RF receiving module 240 when it is determined that a viewer is absent. (S403).

In an embodiment, when it is determined that a viewer is absent, the microcomputer 290 may turn on a preset minimum number of antennas only.

The preset minimum number may be five, but this is only an example.

The preset minimum number may be set as a default when the apparatus is released or may be set according to a user's settings.

The antenna being turned on may be a state in which power to receive A/V data from the A/V transmitting device 100 is supplied.

The antenna being turned off may be a state in which power to receive A/V data from the A/V transmitting device 100 is not supplied.

In a state in which a viewer is absent, when all antennas included in the RF receiving module 240 are turned on, unnecessary power consumption may occur. That is, in this case, to prevent unnecessary power consumption, it is necessary to minimize power consumption by turning on only a minimum number of antennas.

According to an embodiment of the present disclosure, when the absence of a viewer is detected, the A/V receiving device 200 may operate a minimum number of antennas among all antennas included in the RF receiving module 240 to minimize power consumption.

The microcomputer 290 of the A/V receiving device 200 may receive a compressed RF packet from the A/V transmitting device 100 through the turned-on antennas (S405).

The RF packet may be compressed A/V data.

The microcomputer 290 of the A/V receiving device 200 may restore the received compressed RF packet and outputs the restored RF packet through the display 260 (S407).

On the other hand, the microcomputer 290 of the A/V receiving device 200 may obtain a distance between the A/V transmitting device 100 and the A/V receiving device 200 when it is determined that a viewer is not absent (S409).

In an embodiment, the microcomputer 290 may measure the distance between the A/V transmitting device 100 and the A/V receiving device 200 by using a signal to noise ratio (SNR).

The SNR may represent a ratio of the intensity of signal power to that of noise power.

The microcomputer 290 may calculate the SNR by using the power of a transmission signal received by the RF receiving module 240 from the RF transmitting module 150 of the A/V transmitting device 100 and the power of the noise signal included in the transmission signal.

The memory 250 of the A/V receiving device 200 may store the SNR to be matched to the distance between the A/V transmitting device 100 and the A/V receiving device 200.

That is, the memory 250 may store a distance table in which a plurality of SNR values are matched to a plurality of distances between the A/V transmitting device 100 and the A/V receiving device 200 respectively corresponding to the SNR values.

The microcomputer 290 may measure the SNR and obtain a distance corresponding to the measured SNR from the distance table stored in the memory 250.

Again, description will be given referring again to FIG. 4.

In another embodiment, the microcomputer 290 may measure the distance by using a distance detection signal transmitted by the RF receiving module 240 and a reflected signal generated by a reflection of the distance detection signal by the A/V transmitting device 100.

The microcomputer 290 may calculate the distance between the A/V transmitting device 100 and the A/V receiving device 200 by dividing the speed of the distance detection signal by a time taken from transmission of the the distance detection signal to arrival of the reflected signal.

The microcomputer 290 of the A/V receiving device 200 may adjust the number of antennas to be turned on according to the measured distance (S411).

When the distance between the A/V transmitting device 100 and the A/V receiving device 200 is measured, the microcomputer 290 may determine the number of antennas to be turned on, which corresponds to the measured distance.

The microcomputer 290 may determine the number of antennas to be turned on by using a table for number of antennas stored in the memory 250.

The table for number of antennas may be a table in which the distance between the A/V transmitting device 100 and the A/V receiving device 200 is matched to the number of antennas corresponding thereto.

Hereinafter, steps S409 and S411 will be described in detail with reference to the drawings.

FIG. 6 is a flowchart for describing a process of obtaining a distance between an A/V transmitting device and an A/V receiving device and determining the number of antennas to be turned on corresponding to the obtained distance according to an embodiment of the present disclosure.

The microcomputer 290 of the A/V receiving device 200 may measure an SNR based on a reception signal received from the A/V transmitting device 100 (S601).

The microcomputer 290 of the A/V receiving device 200 may obtain includes a distance between the A/V transmitting device and the A/V receiving device, which corresponds to the measured SNR.

The microcomputer 290 may obtain a distance corresponding to the SNR by using the distance table stored in the memory 250.

Details will be described with reference to FIG. 7.

FIG. 7 is a diagram for describing a distance table indicating correspondence relationship between an SNR and a distance between an A/V transmitting device and an A/V receiving device according to an embodiment of the present disclosure.

Referring to FIG. 7, a distance table indicating correspondence relationship between an SNR and a distance between an A/V transmitting device and an A/V receiving device is illustrated.

The distance table 700 may be stored in the memory 250 of the A/V receiving device 200.

The microcomputer 290 may measure the SNR and obtain a distance matching the SNR from the distance table 700 \.

Again, details will be described with reference to FIG. 6.

The microcomputer 290 of the A/V receiving device 200 may determine the number of antennas to be turned on corresponding to the obtained distance (S605).

The microcomputer 290 may determine the number of antennas matched to the distance by using the table for number of antennas stored in the memory 250.

The table for number of antennas may be a table in which the distance between the A/V transmitting device 100 and the A/V receiving device 200 is matched to the number of antennas to be turned on.

Details will be described with reference to FIG. 8.

Figures 8, 9:
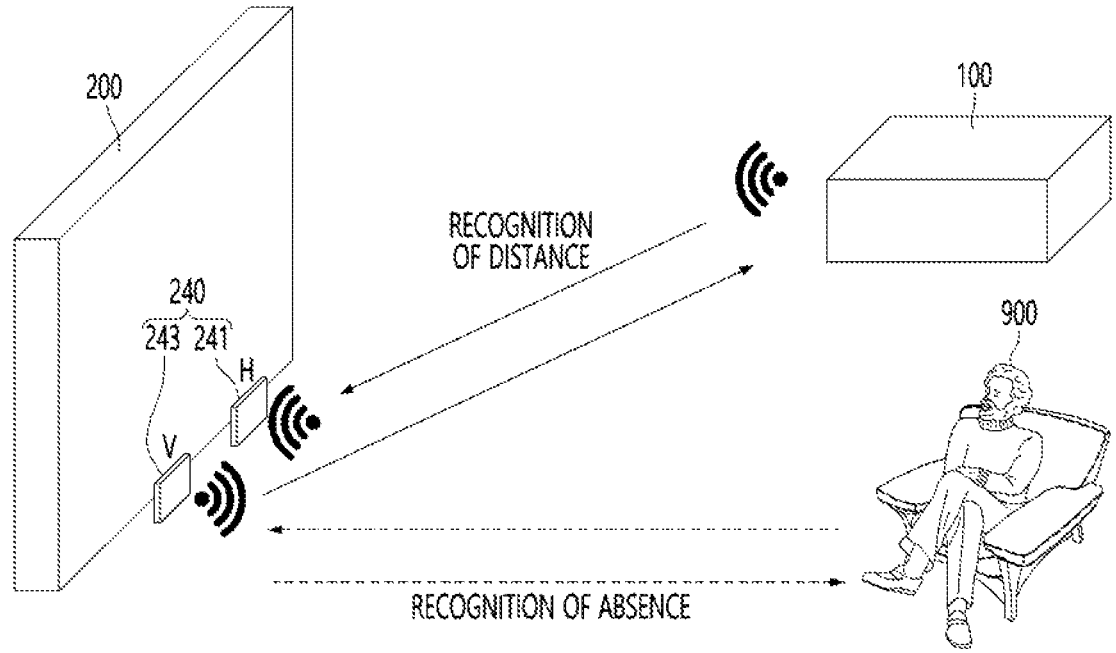
FIG. 8 is a diagram for describing a table for number of antennas according to an embodiment of the present disclosure.
FIG. 9 is a diagram for describing a process of recognizing a viewer's absence and recognizing a distance between an A/V transmitting device and an A/V receiving device, according to an embodiment of the present disclosure.

FIG. 8 is a diagram for describing according to a table for number of antennas embodiment of the present disclosure.

Referring to FIG. 8, there is shown a table for number of antennas 800 in which a distance between the A/V transmitting device 100 and the A/V receiving device 200 is matched to the number of antennas to be turned on.

The microcomputer 290 may determine the number of antennas matched to the distance between the A/V transmitting device 100 and the A/V receiving device 200 obtained from the table for number of antennas 800.

Again, details will be described with reference to FIG. 6.

The microcomputer 290 of the A/V receiving device 200 may turn on the determined number of antennas (S607).

The microcomputer 290 may supply power to antennas corresponding to the determined number of antennas among the plurality of antennas and may not supply power to the remaining antennas.

That is, the microcomputer 290 may turn off the remaining antennas except for the antenna to be turned on.

Again, details will be described with reference to FIG. 4.

The microcomputer 290 of the A/V receiving device 200 may receive a compressed RF packet from the A/V transmitting device 100 through the turned-on antennas (S413).

That is, the microcomputer 290 may receive a compressed RF packet through the turned-on antennas.

The microcomputer 290 of the A/V receiving device 200 may restore the received compressed RF packet and outputs the restored RF packet through the display 260 (S415).

FIG. 9 is a diagram for describing a process of recognizing a viewer's absence and recognizing a distance between an A/V transmitting device and an A/V receiving device, according to an embodiment of the present disclosure.

Referring to FIG. 9, the A/V transmitting device 100, the A/V receiving device 200, and a viewer 900 are illustrated.

In the A/V receiving device 200, the RF receiving module 240 may include a first antenna module 241 and a second antenna module 243.

Each of the first antenna module 241 and the second antenna module 243 may include 16 antennas, but this is only an example.

Each of antennas included in the first antenna module 241 may have a horizontally polarized property.

Each of antennas included in the second antenna module 243 may have a vertically polarized property.

The first antenna module 241 may be used to measure a distance between the A/V transmitting device 100 and the A/V receiving device 200. Specifically, one or more antennas included in the first antenna module 241 may receive a signal for SNR measurement from the A/V transmitting device 100.

The microcomputer 290 may measure an SNR based on the signal received by one or more antennas included in the first antenna module 241, and obtain a distance matched to the measured SNR.

The second antenna module 243 may be used to determine whether a viewer is absent.

One or more antennas included in the second antenna module 243 may transmit a detection signal to the front of the A/V receiving device 200 and receive a reflected signal generated by a reflection of the detection signal.

The microcomputer 290 may determine whether the viewer 900 is present based on the detection signal and the reflected signal.

When the first antenna module 241 measures a distance between the A/V transmitting device 100 and the A/V receiving device 200, the first antenna module 241 may operate in a transmission mode, not in a reception mode for A/V data.

Similarly, when the second antenna module 243 determines whether a viewer is absent, the second antenna module 243 may operate in a transmission mode.

Each of the first antenna module 241 and the second antenna module 243 may operate in a transmission mode in a blank section in which A/V data is not received. That is, each of the first antenna module 241 and the second antenna module 243 may periodically operate in a transmission mode.

Each of the first antenna module 241 and the second antenna module 243 may operate alternately in a transmit mode and a receive mode.

When the first antenna module 241 and the second antenna module 243 are in the transmission mode, their roles may be different. That is, the first antenna module 241 may be used to determine whether a viewer is absent, and the second antenna module 243 may be used to measure the distance between the A/V transmitting device 100 and the A/V receiving device 200.

Figures 10, 11:
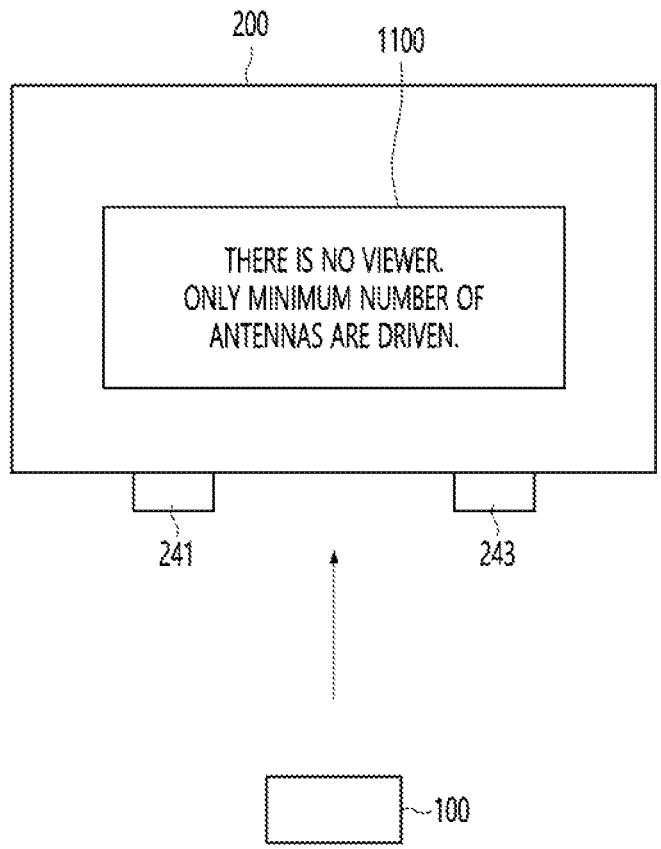
FIG. 10 is a view for describing a matching table according to another embodiment of the present disclosure.
FIG. 11 is a view for describing an example of notifying that a low-power mode is entered when it is detected that a viewer is absent according to an embodiment of the present disclosure.

FIG. 10 is a view for describing a matching table according to another embodiment of the present disclosure.

Referring to FIG. 10, there is shown a matching table 1000 showing a correspondence relationship between SNR, the distance between the A/V transmitting device 100 and the A/V receiving device 200, and the number of antennas to be turned on.

The matching table 1000 may be stored in the memory 250 of the A/V receiving device 200.

When the microcomputer 290 of the A/V receiving device 200 obtains only one of the SNR or the distance between the A/V transmitting device 100 and the A/V receiving device 200, the microcomputer 290 of the A/V receiving device 200 may determine the number of antennas to be turned, through the matching table 1000.

For example, when an SNR of 60 dB is measured, the microcomputer 290 may determine 16 antennas to be turned on.

When the distance between the A/V transmitting device 100 and the A/V receiving device 200 is 2 m, the microcomputer 290 may determine the number of antennas to be turned on as eight.

As described above, according to an embodiment of the present disclosure, the number of antennas to be turned on is adjusted according to a network environment or a distant distance between the A/V transmitting device 100 and the A/V receiving device 200, thus preventing unnecessary power consumption.

FIG. 11 is a view for describing an example of notifying that a low-power mode is entered when it is detected that a viewer is absent according to an embodiment of the present disclosure.

Referring to FIG. 11, when it is detected that a viewer is absent, the A/V receiving device 200 may display a first message 1100 indicating that only the minimum number of antennas are driven through a display.

The user may identify that the first antenna module 241 and the second antenna module 243 included in the RF receiving module 240 have entered the low power mode, through the first message 1100.

Figure 12:
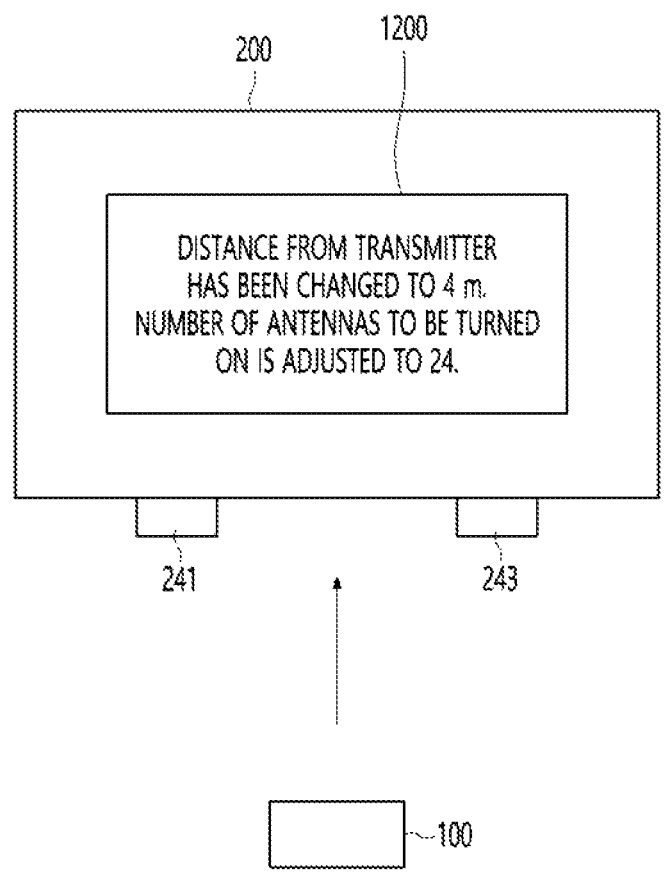
FIG. 12 is a view for describing an example of notifying that a distance between an A/V transmitting device and an A/V receiving device is changed according to an embodiment of the present disclosure.

FIG. 12 is a view for describing an example of notifying that a distance between an A/V transmitting device and an A/V receiving device is changed according to an embodiment of the present disclosure.

Referring to FIG. 12, when the distance between the A/V transmitting device 100 and the A/V receiving device 200 is changed, the A/V receiving device 200 may display a second message 1200 indicating that the number of antennas to be turned on is changed through the display.

The number of antennas to be turned on increases as the distance between the A/V transmitting device 100 and the A/V receiving device 200 increases, and deceases as the distance between the A/V transmitting device 100 and the A/V receiving device 200 decreases.

The second message 1200 may indicate that the number of antennas to be turned on increases when the distance between the A/V transmitting device 100 and the A/V receiving device 200 is greater than an existing distance.

The second message 1200 may indicate that the number of antennas to be turned on decreases when the distance between the A/V transmitting device 100 and the A/V receiving device 200 is less than an existing distance.

When the distance between the A/V transmitting device 100 and the A/V receiving device 200 decreases, the number of turned-on antennas is reduced, thereby preventing power consumption.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The A/V transmitting device described above is not limitedly applicable to the configuration and method of the above-described embodiments, and the embodiments are configured by selectively combining all or part of each of the embodiments such that various modifications can be made.

What is claimed is:

1. An Audio/Video (A/V) receiving device comprising:
   a display;
   a Radio Frequency (RF) receiving module configured to receive an RF packet from an A/V transmitting device, the RF receiving module including a plurality of antennas; and
   a microcomputer configured to:
      obtain a distance between the A/V transmitting device and the A/V receiving device and
   adjust a number of antennas to be turned on or turned off among the plurality of antennas according to the obtained distance is being changed.

2. The A/V receiving device of claim 1, the microcomputer displays, on the display, a first message indicating that the number of antennas to be turned on or turned off when the obtained distance is changed.

3. The A/V receiving device of claim 2, wherein the first message indicates that the number of antennas to be turned on decreases as the distance decreases.

4. The A/V receiving device of claim 2, wherein the first message indicates that the number of antennas to be turned on increases as the distance increases.

5. The A/V receiving device of claim 2, wherein the microcomputer is further configured to display a second message indicating that a minimum number of antennas are driven through the display when it is detected that a viewer is absent.

6. The A/V receiving device of claim 5, wherein at least one of the plurality of antennas transmits a detection signal to an object and receives a reflected signal corresponding to the detection signal,
   wherein the microcomputer is further configured to detect whether the viewer is absent based on the detection signal and the reflected signal.

7. The A/V receiving device of claim 1, further comprising:
   a memory configured to store a table indicating a correspondence relationship between the distance and a number of antennas to be turned on,
   wherein the microcomputer obtains is further configured to obtain the number of antennas to be turned on, which is matched to the distance, from the table.

8. The A/V receiving device of claim 1, wherein the microcomputer is further configured to obtain the distance by using a signal to noise ratio (SNR), which is a ratio of an intensity of power of a reception signal to power of a noise of a reception signal received from the A/V transmitting device.

9. The A/V receiving device of claim 8, further comprising:
   a memory configured to store a table indicating a correspondence relationship between the SNR and the distance corresponding to the SNR,
   wherein the microcomputer is further configured to obtain the distance matched to the SNR from the table.

10. The A/V receiving device of claim 1, wherein the microcomputer is further configured to obtain the distance by using a distance detection signal transmitted by the RF receiving module and a reflected signal generated by a reflection of the distance detection signal by the A/V transmitting device.

11. The A/V receiving device of claim 1, wherein the microcomputer is further configured to supply power to a number of antennas to be turned on corresponding to the distance among the plurality of antennas, and not to supply power to remaining antennas to be turned off.

12. A wireless display system comprising:
an Audio/Video (A/V) transmitting device configured to generate a Radio Frequency (RF) packet and transmit the generated RF packet to an A/V receiving device through RF communication; and
the A/V receiving device configured to obtain a distance between the A/V transmitting device and the A/V receiving device and adjust a number of antennas to be turned on or turned off among the plurality of antennas according to the obtained distance is being changed.

13. The wireless display system of claim 11, the A/V receiving device displays a first message indicating that the number of antennas to be turned on or turned off when the obtained distance is changed.

14. The wireless display system of claim 13, wherein the first message indicates that the number of antennas to be turned on or turned off decreases when the distance decreases.

15. The wireless display system of claim 13, wherein the first message indicates that the number of antennas to be turned on increases as the distance increases.

16. The wireless display system of claim 13, wherein the A/V receiving device displays is further configured to display, through a display, a second message indicating that a minimum number of antennas are driven through the display when it is detected that a viewer is absent.

17. The wireless display system of claim 13, wherein the A/V receiving device stores is further configured to store a table indicating a correspondence relationship between the distance and a number of antennas to be turned on,
wherein the A/V receiving device obtains is further configured to obtain the number of antennas to be turned on, which is matched to the distance, from the table.

18. The wireless display system of claim 17, wherein the A/V receiving device supplies is further configured to supply power to a number of antennas to be turned on corresponding to the distance among the plurality of antennas, and not to supply power to remaining antennas to be turned off.

19. The wireless display system of claim 12, wherein the A/V receiving device is further configured to obtain the distance by using a distance detection signal transmitted by a RF receiving module of the A/V receiving device and a reflected signal generated by a reflection of the distance detection signal by the A/V transmitting device.

* * * * *